(12) United States Patent
Takahashi et al.

(10) Patent No.: US 11,553,009 B2
(45) Date of Patent: Jan. 10, 2023

(54) INFORMATION PROCESSING DEVICE, INFORMATION PROCESSING METHOD, AND COMPUTER PROGRAM FOR SWITCHING BETWEEN COMMUNICATIONS PERFORMED IN REAL SPACE AND VIRTUAL SPACE

(71) Applicant: SONY CORPORATION, Tokyo (JP)

(72) Inventors: Kei Takahashi, Tokyo (JP); Takayoshi Shimizu, Chiba (JP); Ryouhei Yasuda, Kanagawa (JP); Ayumi Nakagawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 25 days.

(21) Appl. No.: 16/966,701

(22) PCT Filed: Nov. 28, 2018

(86) PCT No.: PCT/JP2018/043825
§ 371 (c)(1),
(2) Date: Jul. 31, 2020

(87) PCT Pub. No.: WO2019/155735
PCT Pub. Date: Aug. 15, 2019

(65) Prior Publication Data
US 2021/0037063 A1    Feb. 4, 2021

(30) Foreign Application Priority Data

Feb. 7, 2018    (JP) .............................. JP2018-020439

(51) Int. Cl.
*H04L 65/1059*    (2022.01)
*G06T 19/00*    (2011.01)
(Continued)

(52) U.S. Cl.
CPC ........ *H04L 65/1059* (2013.01); *G06T 19/006* (2013.01); *H04L 65/1083* (2013.01); *H04L 67/52* (2022.05); *G06T 2219/024* (2013.01)

(58) Field of Classification Search
CPC . H04L 65/1059; H04L 65/1083; H04L 67/18; G06T 19/006; G06T 2219/024
(Continued)

(56) References Cited

U.S. PATENT DOCUMENTS 7,003,040 B2 *    2/2006 Yi .......................... H04N 7/147
                                               375/240.24
7,231,205 B2 *    6/2007 Guyot ..................... H04L 67/36
                                               455/414.1
(Continued)

FOREIGN PATENT DOCUMENTS

JP    2001-154966 A    6/2001
JP    2002-259318 A    9/2002
(Continued)

*Primary Examiner* — David P Zarka
(74) *Attorney, Agent, or Firm* — Paratus Law Group, PLLC

(57) ABSTRACT

There is provided an information processing device, an information processing method, and a computer program that enable to switch communication between virtual space and real space smoothly. The information processing device includes a communication control unit that controls communication performed in virtual space in which a virtual image corresponding to a real image of a user present in real space is created, interactively between users through the virtual image of the user; a user-information acquiring unit that acquires position information regarding a position of the user in the real space and attribute information including at least information regarding intimacy between the users at predetermined timing; and a switching control unit that controls switching between communication performed in the real space and communication performed in the virtual (Continued)

space according to at least either one of the position information and the attribute information.

14 Claims, 11 Drawing Sheets

(51) Int. Cl.
*H04L 65/1083* (2022.01)
*H04L 67/52* (2022.01)

(58) Field of Classification Search
USPC .......................................................... 709/219
See application file for complete search history.

(56) References Cited

U.S. PATENT DOCUMENTS

| | | | | |
|---|---|---|---|---|
| 8,634,658 | B2* | 1/2014 | Onoe | G06T 11/60 |
| | | | | 382/217 |
| 9,373,195 | B2* | 6/2016 | Kasahara | G06F 3/0488 |
| 9,727,996 | B2* | 8/2017 | Pandey | G06F 3/013 |
| 9,898,844 | B2* | 2/2018 | Mullins | G06T 11/60 |
| 9,990,774 | B2* | 6/2018 | Mao | A63F 13/211 |
| 10,101,585 | B2* | 10/2018 | Ueno | G06F 3/017 |
| 10,176,636 | B1* | 1/2019 | Neustein | G06T 7/246 |
| 10,452,128 | B2* | 10/2019 | Ishihara | G02B 27/0172 |
| 10,500,496 | B2* | 12/2019 | Clark | G06F 3/147 |
| 10,521,947 | B2* | 12/2019 | Yokokawa | G06F 3/014 |
| 10,587,742 | B2* | 3/2020 | Cho | G06F 3/04883 |
| 10,832,479 | B2* | 11/2020 | Nishibe | G06T 19/20 |
| 10,977,774 | B2* | 4/2021 | Katori | G06K 9/00201 |
| 11,100,711 | B2* | 8/2021 | Lyren | G02B 27/0093 |
| 2008/0215975 | A1* | 9/2008 | Harrison | A63F 13/213 |
| | | | | 715/706 |
| 2008/0254813 | A1* | 10/2008 | Kano | H04W 4/029 |
| | | | | 455/456.6 |
| 2015/0312561 | A1* | 10/2015 | Hoof | H04N 21/41415 |
| | | | | 348/46 |
| 2017/0043252 | A1* | 2/2017 | Kalabou | G06F 3/011 |
| 2017/0061700 | A1* | 3/2017 | Urbach | G06F 3/011 |
| 2017/0103564 | A1 | 4/2017 | Hayashida | |
| 2017/0332044 | A1 | 11/2017 | Marlow et al. | |

FOREIGN PATENT DOCUMENTS

| | | |
|---|---|---|
| JP | 2008-270913 A | 11/2008 |
| JP | 2010-268305 A | 11/2010 |
| JP | 2015-080120 A | 4/2015 |
| JP | 2017-102897 A | 6/2017 |
| WO | WO 2016/164178 A1 | 10/2016 |

* cited by examiner

FIG.3
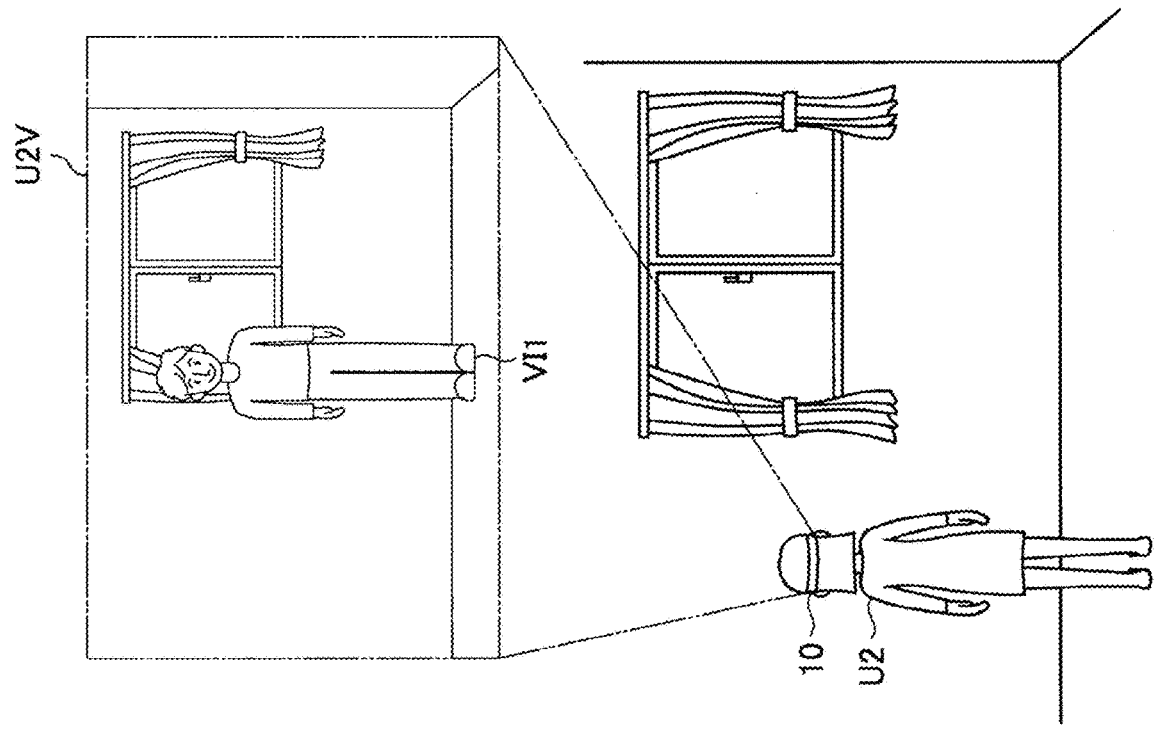
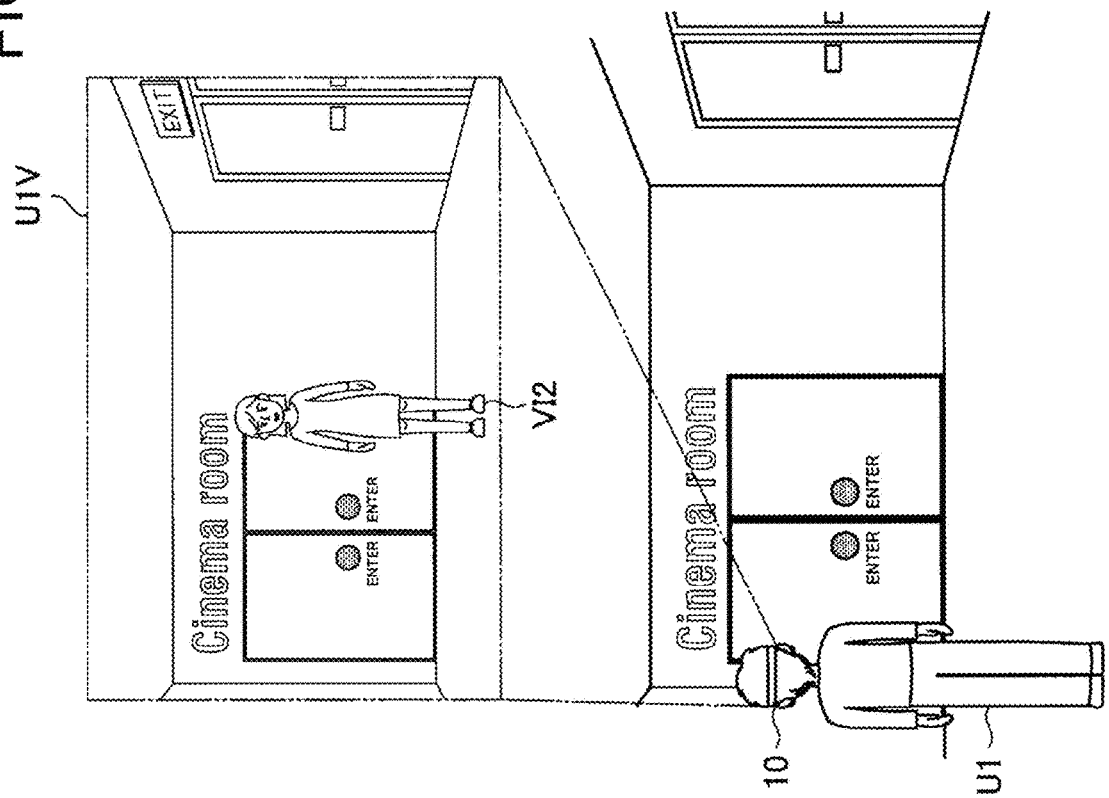

FIG.5
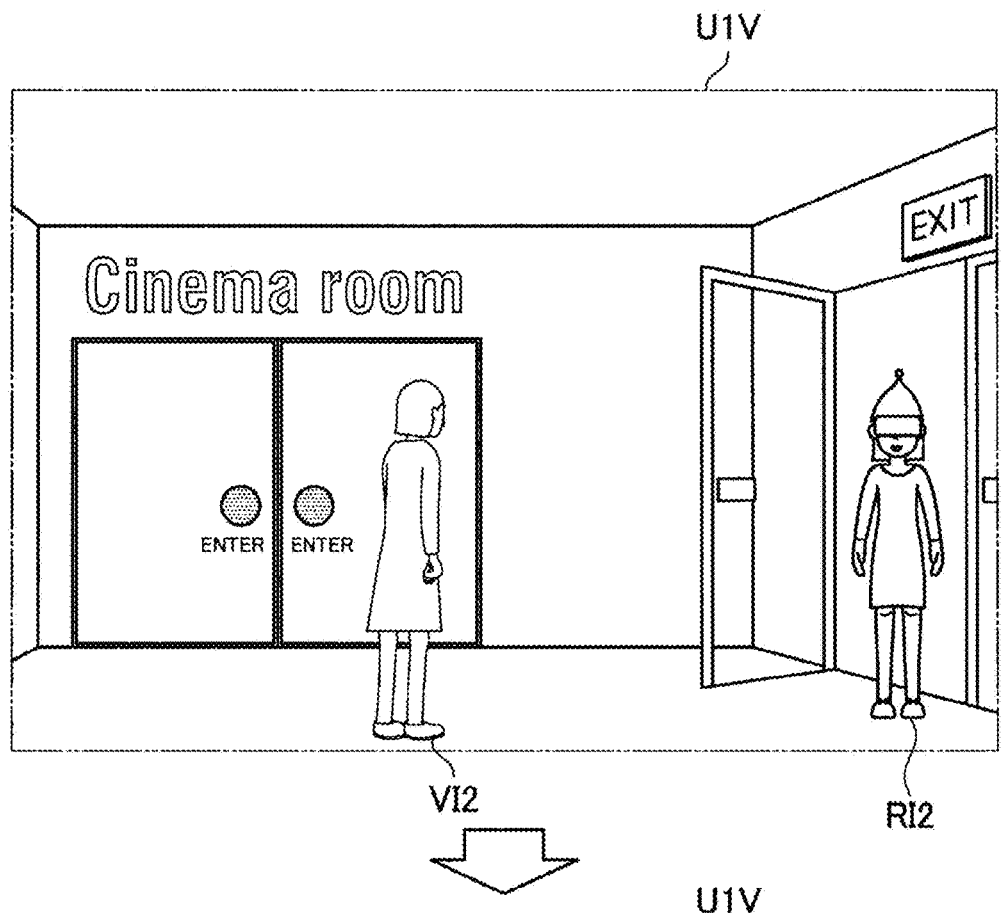
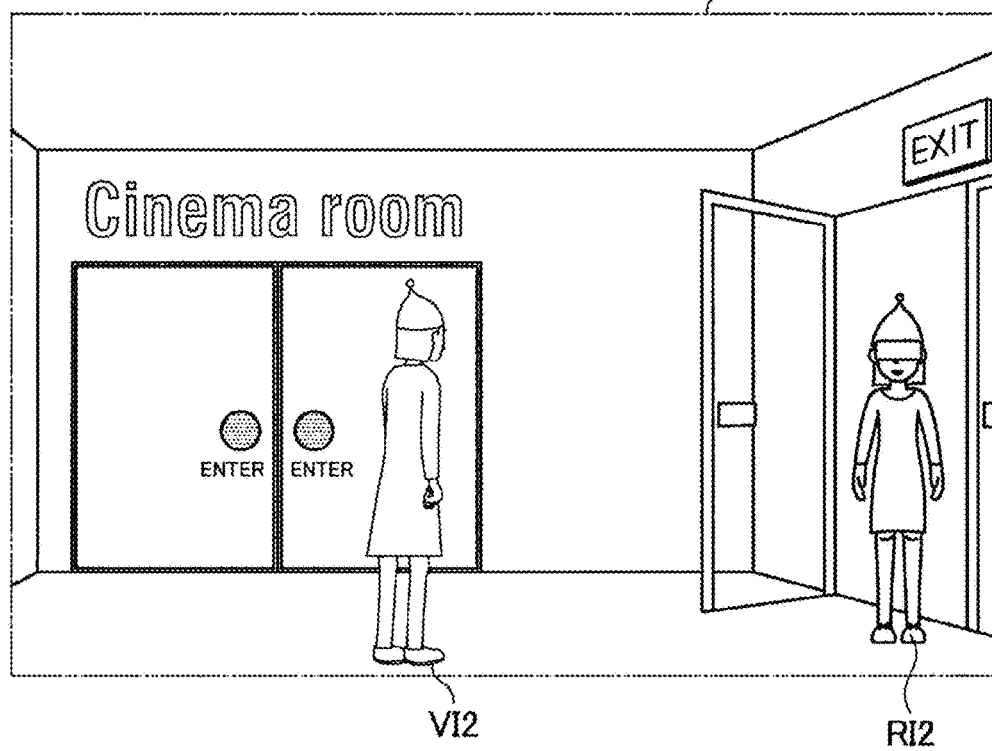

FIG.6
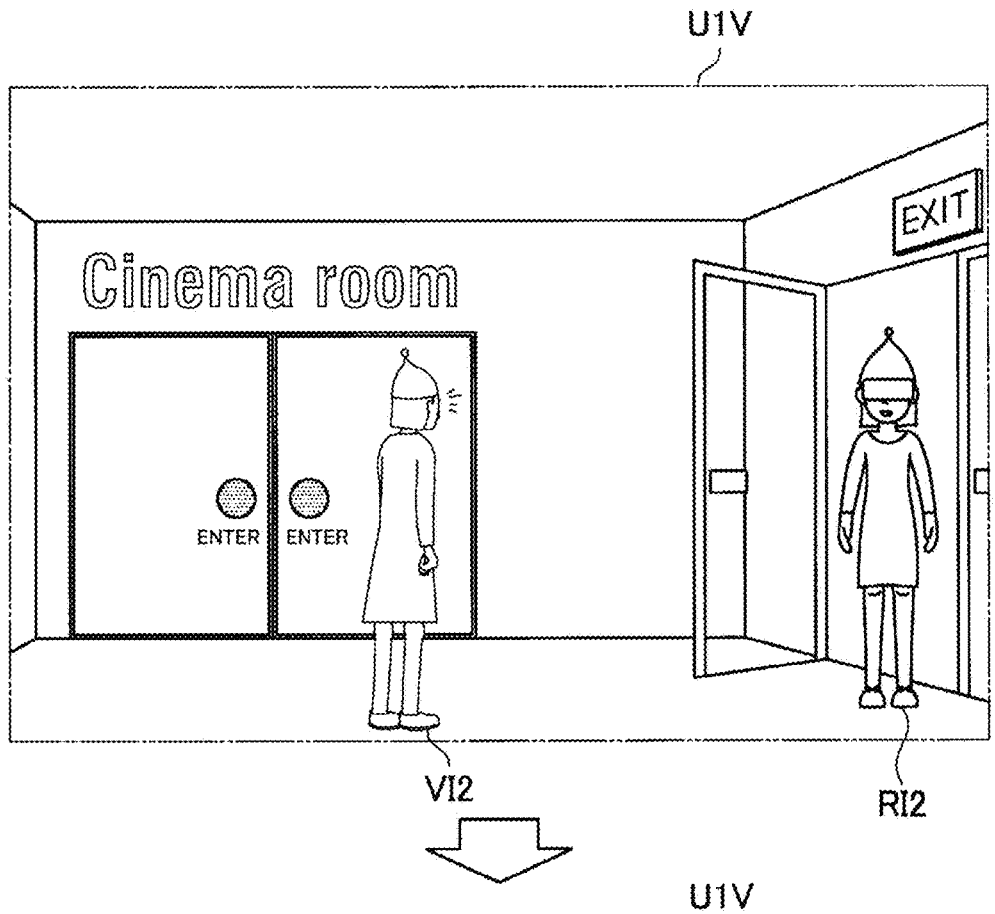
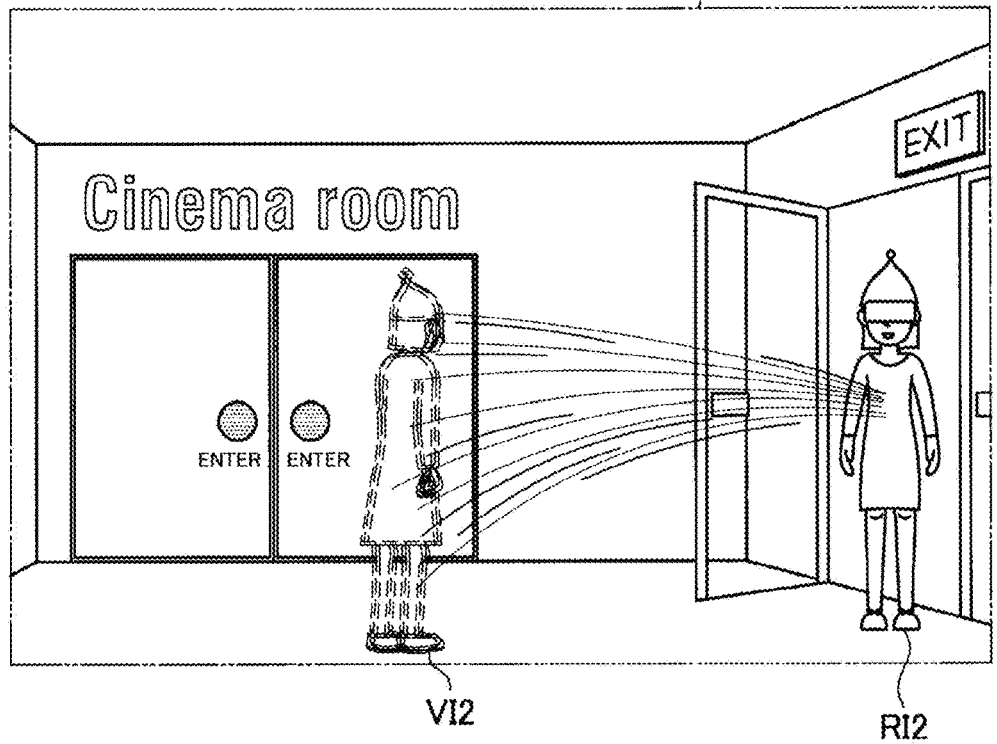

INFORMATION PROCESSING DEVICE, INFORMATION PROCESSING METHOD, AND COMPUTER PROGRAM FOR SWITCHING BETWEEN COMMUNICATIONS PERFORMED IN REAL SPACE AND VIRTUAL SPACE

CROSS REFERENCE TO PRIOR APPLICATION

This application is a National Stage Patent Application of PCT International Patent Application No. PCT/JP2018/043825 (filed on Nov. 28, 2018) under 35 U.S.C. § 371, which claims priority to Japanese Patent Application No. 2018-020439 (filed on Feb. 7, 2018), which are all hereby incorporated by reference in their entirety.

FIELD

The present disclosure relates to an information processing device, an information processing method, and a computer program.

BACKGROUND

Development of technology enabling participation of multiple users at the same time and enabling real-time communication in a virtual world having predetermined spatial expanse built on a computer network, such as the Internet, has been conducted.

For example, Patent Literature 1 below discloses a conversation support system that enables communication with other users by performing a calling operation with a virtual mobile phone that is usable by an avatar of a user logged into a virtual world.

Citation List

Patent Literature

Patent Literature 1: JP 2001-154966 A

SUMMARY

Technical Problem

However, with such a conversation support system as the one disclosed in Patent Literature 1, when an avatar of a user in communication logs out of the virtual world, communication with the user, which exists in real space, cannot be continued. Therefore, there is a scope for improvement in switching communication space among users.

Accordingly, in view of the above situation, the present disclosure proposes an information processing device, an information processing method, and a computer program that enable to smoothly switch fields of communication among users between virtual space and real space.

Solution to Problem

According to the present disclosure, an information processing device is provided that includes: a communication control unit that controls communication performed in virtual space in which a virtual image corresponding to a real image of a user present in real space is created, interactively between users through the virtual image of the user; a user-information acquiring unit that acquires position information regarding a position of the user in the real space and attribute information including at least information regarding intimacy between the users, at predetermined timing; and a switching control unit that controls switching between communication performed in the real space and communication performed in the virtual space according to at least either one of the position information and the attribute information.

Moreover, according to the present disclosure, an information processing method is provided that includes: controlling communication performed in virtual space in which a virtual image corresponding to a real image of a user present in real space is created, interactively between users through the virtual image of the user; acquiring position information regarding a position of the user in the real space and attribute information including at least information regarding intimacy between the users, at predetermined timing; and controlling switching between communication performed in the real space and communication performed in the virtual space according to at least either one of the position information and the attribute information.

Moreover, according to the present disclosure, a computer program is provided that causes a computer to perform functions of: a communication control unit that controls communication performed in virtual space in which a virtual image corresponding to a real image of a user present in real space is created, interactively between users through the virtual image of the user; a user-information acquiring unit that acquires position information regarding a position of the user in the real space and attribute information including at least information regarding intimacy between the users, at predetermined timing; and a switching control unit that controls switching between communication performed in the real space and communication performed in the virtual space according to at least either one of the position information and the attribute information.

According to the present disclosure, contents to be output to virtual space are controlled according to attribute information that includes at least position information regarding a position of a user in real world and information regarding intimacy between users.

Advantageous Effects of Invention

As described above, according to the present disclosure, communication space can be smoothly switched between virtual world and real world.

Note that the above effect is not necessarily limited, but any effect described in the present application or other effects that can be understood from the present application may be produced together with the above effect, or instead of the above effect.

BRIEF DESCRIPTION OF DRAWINGS

FIG. 3 is an explanatory diagram for explaining an operation of the information processing device according to the embodiment.

FIG. 5 is an explanatory diagram for explaining an operation of the information processing device according to the embodiment.

FIG. 6 is an explanatory diagram for explaining an operation of the information processing device according to the embodiment.

DESCRIPTION OF EMBODIMENTS

Hereinafter, exemplary embodiments of the present disclosure will be described in detail with reference to the accompanying drawings. Note that an identical reference symbol is assigned to components having substantially the same functional elements, and duplicated explanation is thereby omitted in the present application and the drawings.

Moreover, in some cases, plural components having substantially the same functional elements are distinguished from one another by adding different alphabets at the end of an identical reference symbol in the present application and the drawings. Note that when it is not necessary to distinguish respective functional elements having substantially the same functional configuration from one another, only an identical reference symbol is assigned thereto.

Explanation will be given in following order.
Configuration
Operation
  Operation Example 1
  Operation Example 2
Hardware Configuration
Conclusion

Configuration

Figure 1:
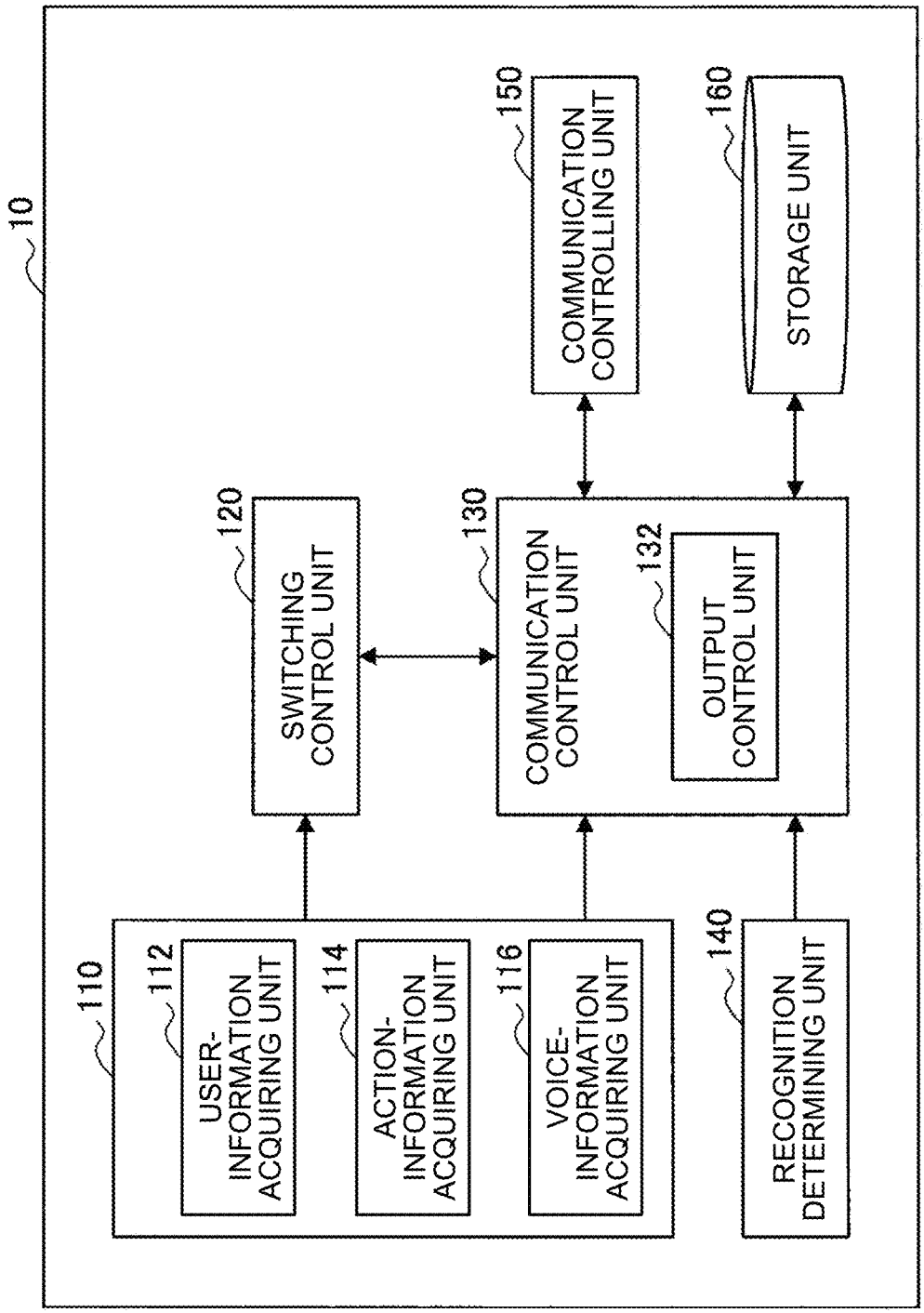
FIG. 1 is a block diagram illustrating an example of a configuration of an information processing device according to an embodiment of the present disclosure.
Figure 2:
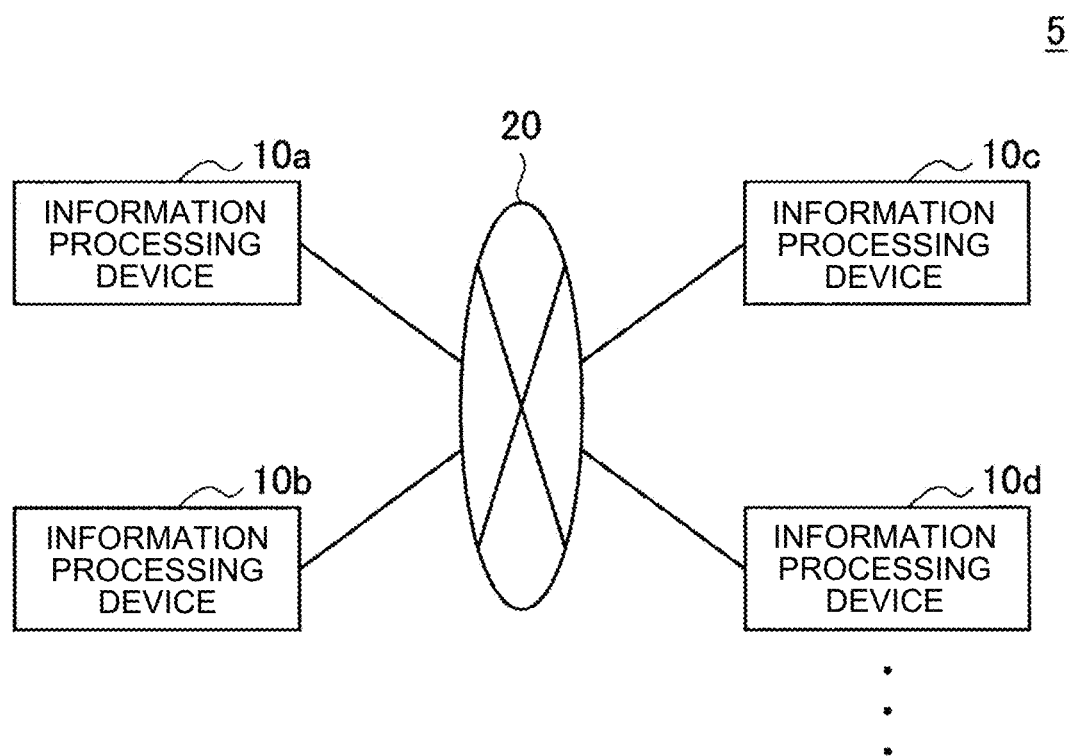
FIG. 2 is a block diagram illustrating an example of a configuration of an information processing system according to the embodiment.

First, a configuration of an information processing device 10 according to an embodiment of the present disclosure will be described, referring to FIG. 1 and FIG. 2. FIG. 1 is a block diagram illustrating a configuration example of the information processing device 10 according to an embodiment of the present disclosure. FIG. 2 is a block diagram illustrating a configuration example of an information processing system 5 according to the embodiment of the present disclosure.

The information processing device 10 according to the embodiment is a device for multiple users to communicate with one another, while displaying an image or an avatar of an each other's communication partner on a display screen. In the information processing system 5 according to the present embodiment, multiple units of the information processing devices 10a-10d are connected to one another through a network 20 as illustrated in FIG. 2, and interactive communication is performed in virtual space. The information processing device 10 is a device that creates, in virtual space, a virtual image corresponding to an actual image of a user that exist in real space, and that implements communication among users through the virtual images. The information processing device 10 according to the present embodiment is a device configured to be usable by a user while moving, and may be a device that is used by being worn by a user as, for example, a glasses-type display, a head mount display (HMD), and the like, and may be a mobile communication device having a display device, such as a smartphone.

The network 20 is implemented by using a publicly-known information communication technique as, for example, the Internet and the like, and is capable of connecting multiple units of the information processing devices 10a-10d with one another, and enables multiple users to have communication at the same time.

The information processing device 10 according to the present embodiment includes, at least, an information acquiring unit 110 that acquires information, such as user information regarding a user, action information regarding an action of a user, and voice information regarding a voice spoken by a user, a switching control unit 120 that switches space in which communication is performed according to the information acquired by the information acquiring unit 110, a communication control unit 130 that controls various kinds of functions in communication, such as a connection status of communication performed interactively among users, as illustrated in FIG. 2. Furthermore, the information processing device 10 according to the present embodiment is preferable to include a recognition determining unit 140, a communication controlling unit 150, and a storage unit 160.

Information Acquiring Unit 110

The information processing device 10 according to the present embodiment includes the information acquiring unit 110. The information acquiring unit 110 acquires information to smoothly switch space of communication performed by a user. This information acquiring unit 110 includes at least a user-information acquiring unit 112, and may further include an action-information acquiring unit 114 and a voice-information acquiring unit 116. As at least either one of the user-information acquiring unit 112, the action-information acquiring unit 114, and the voice-information acquiring unit 116 functions, various kinds of information to smoothly switch space of communication performed by the user are acquired.

User-Information Acquiring Unit 112

The user-information acquiring unit 112 acquires position information regarding a position of a user in real space and attribute information that includes at least information regarding intimacy between users, at predetermined timing. More specifically, the user-information acquiring unit 112 may acquire position information of the information processing device 10 equipped with the user-information acquiring unit 112. Moreover, the user-information acquiring unit 112 may have a function of acquiring position information and attribute information of the other user through the communication controlling unit 150 described later.

The user-information acquiring unit 112 may acquire the position information of a user by using a publicly-known position-information acquiring system. As the publicly-known position-information acquiring system, for example, a position acquiring system such as a global navigation satellite system (GNSS), an indoor positioning system, and a base-station positioning system of a mobile network and Wi-Fi (registered trademark) may be used. Moreover, a tag used for position detection, such as beacon, may be added to the information processing device 10, and the user-information acquiring unit 112 may receive information regarding this tag as position information. Furthermore, the information processing device 10 may have a communication function enabling to identify a direction of a user, and the user-information acquiring unit 112 may acquire information regarding this direction of a user as position information.

Moreover, as explained previously, position information of the other user may be acquired from the other user through the communication controlling unit 150, but another publicly-known position-information acquisition technique may be used for acquisition of position information of the other user. For example, the information processing device 10 according to the present embodiment may include an imaging device that images an environmental image of real space, and position information of the other user may be acquired by using a shot image generated by this imaging device. For acquisition of position information of other users, various kinds of position estimation techniques disclosed in, for example, JP-A-2010-16743, Japanese Patent No. 5869883, JP-A-2017-182739, and the like may be used appropriately. The imaging device equipped in the information processing device 10 may be a publicly-known imaging device having an imaging function, such as a digital still camera and a digital video camera, for example. Moreover, the user-information acquiring unit 112 may acquire position information of the other user acquired based on an image of the other user imaged by an external camera or the like arranged in real space, through a publicly-known network, or the like.

The user-information acquiring unit 112 may be configured to acquire rough position information of the other user by a GNSS or an indoor positioning system when a separation distance between users communicating with each other is large, and to acquire position information of the other user by image processing when the separation distance between the users becomes small and when the users are imaged by the imaging device.

Moreover, the position information also includes secondary information that is acquired based on positions of multiple users, such as a separation distance between users.

Furthermore, the information regarding intimacy between users, which is one of the attribute information acquired by the user-information acquiring unit 112, includes, for example, frequency of communication performed by using the information processing device 10 according to the present embodiment, information about time, conversation contents, and the like, whether user information is present in a contact list stored in the storage unit 160, and the like. This information regarding frequency of communication, time, conversation contents, and the like may be stored in the storage unit 160 provided in the information processing device 10 as history information.

Moreover, the attribute information may include nonverbal communication information, such as a facial expression of a user, a gesture, and a type of voice, (hereinafter, simply denoted as "non-verbal communication information" briefly) that is acquired during use of the information processing device 10 according to the present embodiment. A part of functions of the user-information acquiring unit 112 may be implemented by, for example, an imaging device as the one previously described. It is preferable that the imaging device to be used have a function of collecting a voice spoken by the user of the information processing device 10 according to the present embodiment, and the non-verbal communication information may be acquired by such an imaging device. Furthermore, if mental states of a user according to the non-verbal communication information have been set in advance, the user-information acquiring unit 112 can acquire mental state information regarding a mental state of the user. This mental state information is also included in the attribute information. The mental state information may be automatically generated from the non-verbal communication information by machine learning by the information processing device 10. Moreover, to the information processing device 10 according to the present embodiment, for example, a tag relating to the attribute of a user may be added, and the user-information acquiring unit 112 may acquire the information regarding this tag as the attribute information.

As described previously, the user-information acquiring unit 112 may acquire the attribute information of the other user through the communication controlling unit 150. Furthermore, the user-information acquiring unit 112 may acquire information by the imaging device separately provided in the information processing device 10, or through an image and a voice acquired by the imaging device arranged in real space as described above.

The user-information acquiring unit 112 acquires the position information and the attribute information of the user and the position information and the attribute information of the other user at predetermined timing. For example, the user-information acquiring unit 112 may acquire the position information and the attribute information whenever necessary, or may acquire at a time set by the user in advance. Moreover, the user-information acquiring unit 112 may transmit the position information and the attribute information to at least either one of the switching control unit 120 and the communication control unit 130 described later whenever necessary, or may transmit at a time set in advance.

Action-Information Acquiring Unit 114

The action-information acquiring unit 114 acquires action information regarding an action, such as a body gesture and a hand gesture, of the user. The action information acquired by the action-information acquiring unit 114 may be transmitted to the switching control unit 120 described later, to be used as one of triggers for switching space of communication performed between users. Moreover, this action information may be used as a trigger for starting communication, selecting a user with which communication is connected from among multiple users.

A function of the action-information acquiring unit 114 may be implemented, for example, by a publicly-known imaging device that has an imaging function as described above. More specifically, for acquisition of the action information, for example, a publicly-known gesture recognition technique can be used, and for example, a technique disclosed in JP-A-2013-205983, and the like can be used appropriately.

Voice-Information Acquiring Unit 116

The voice-information acquiring unit 116 acquires voice information regarding a voice spoken by a user. The voice information acquired by the voice-information acquiring unit 116 may be provided to the other user through the communication control unit 130 described later. Furthermore, the voice-information acquiring unit 116 may analyze the voice information by using a publicly-known voice recognition technique, to thereby acquire voice recognition information by performing voice recognition of recognizing contents of the voice information. The voice information acquired by the voice-information acquiring unit 116 may be transmitted to the switching control unit 120 described later, to be used as one of triggers for switching space of communication performed between users. A function of the voice-information acquiring unit 116 may be implemented by a voice collecting device, such as a voice pickup microphone, or may be implemented by a voice pickup device that is equipped in the imaging device separately provided in the information processing device 10. Furthermore, the voice-information acquiring unit 116 may acquire a voice generated around the information processing device 10.

Switching Control Unit 120

The information processing device 10 according to the present embodiment includes the switching control unit 120. The switching control unit 120 controls switching between communication performed in real space and communication performed in virtual space according to at least either one of the position information and the attribute information transmitted from the information acquiring unit 110. the switching control unit 120 may be configured to establish communication between users, for example, when a separation distance between the users becomes equal to or larger than a predetermined threshold, and to enable the communication in virtual space. The switching control unit 120 can switch communication space according to a separation distance between users and time information. For example, even when the separation distance between users becomes equal to or larger than the predetermined threshold, if duration of a state in which the separation distance is equal to or larger than the predetermined threshold is shorter than predetermined time, communication in real space may be maintained. Furthermore, for example, the switching control unit 120 may be configured to terminate connection of communication between users when a separation distance between users performing communication in virtual space becomes equal to or smaller than a predetermined threshold, and to enable communication in real space.

Moreover, the switching control unit 120 can switch communication space according to intimacy between users, which is one of the attribute information. For example, when frequency and time of communication between specific users performed by using the information processing device 10 is equal to or larger than predetermined frequency or time, communication space may be switched from real space to virtual space.

The switching control unit 120 may further be configured to establish network connection between users according to the action information acquired by the action-information acquiring unit 124, and to switch space of communication between the users from real space to virtual space. More specifically, controls relating to switching according to the action information are set in advance in the switching control unit 120, and the switching control unit 120 is thereby enabled to switch communication space according to the acquired action information. For example, any of users making communication in real space makes an action intended as goodbye (for example, a hand-waving action, or the like) at the site, the switching control unit 120 may switch the communication space from the real space to the virtual space based on the action information acquired by the action-information acquiring unit 114. As the communication space is thus switched from the real space to the virtual space, users are enabled to continue conversation naturally without interruption. Note that the association between action intentions of users and action information may be made by machine learning by the information processing device 10, and the switching control unit 120 may switch communication space from real space to virtual space based on the action information.

The switching control unit 120 may further be configured to establish network connection between users according to the voice recognition information acquired by the voice-information acquiring unit 116, to switch space of communication between the users from real space to virtual space. More specifically, controls relating to switching according to the voice recognition information acquired from the voice-information acquiring unit 116 are set in advance, and the switching control unit 120 is thereby enabled to switch communication space according to the voice recognition information. Specifically, the voice-information acquiring unit 116 of either one of users making communication in real space picks up predetermined voice information, such as a farewell greeting at the site, analyzes contents of the voice information, to acquire voice recognition information corresponding to the voice information. The switching control unit 120 may switch communication space from the real space to virtual space based on the voice recognition information acquired from the voice-information acquiring unit 116. Similarly, when the voice-information acquiring unit 116 acquires predetermined voice information, the switching control unit 120 may switch communication space from the virtual space to the real space.

The switching control unit 120 may further be configured to select at least one of the other users among multiple users to switch communication space from real space to virtual space according to the action information acquired by the action-information acquiring unit 114. Specifically, while virtual images of the multiple users having communication in real space are displayed in virtual space, when the switching control unit 120 receives action information corresponding to an action of selecting a virtual image, the switching control unit 120 may switch communication made with the other user subject to the action information from the real space to the virtual space.

Communication Control Unit 130

The information processing device 10 according to the present embodiment includes the communication control unit 130. The communication control unit 130 generally controls various kinds of functions in communication including a control of a connection state of interactive communication performed between users through virtual images of the users in virtual space in which the virtual images corresponding to real images of the users existing in real space are created. The communication. control unit 130 has, for example, a function of enabling conversation among users while displaying images or avatars of the users that are communication partners on a display mounted on the information processing device 10. Moreover, the communication control unit 130 may end the communication depending on the user information, the action information, and the voice information acquired by the information acquiring unit 110, without switching communication space to virtual space.

The communication control unit 130 includes an output control unit 132 that controls output contents according to various kinds of information acquired by the information acquiring unit 110, user recognition information that includes recognition confirmation information of a real image of a communication partner in real space acquired by the recognition determining unit 140, and the like.

The function of the output control unit 132 will be described, referring to FIG. 3. The output control unit 132 displays, in virtual space, a virtual image corresponding to a real image of the other user in real space. For example, as illustrated in FIG. 3, the output control unit 132 provided in the information processing device 10 used by a user U1 can provide virtual space U1V and a virtual image of a user U2 of a communication partner to the user U1. Similarly, the output control unit 132 provided in the information processing device 10 used by the user U2 can provide virtual space U2V and a virtual image of the user U1 of a communication partner to the user U1.

Figure 4:
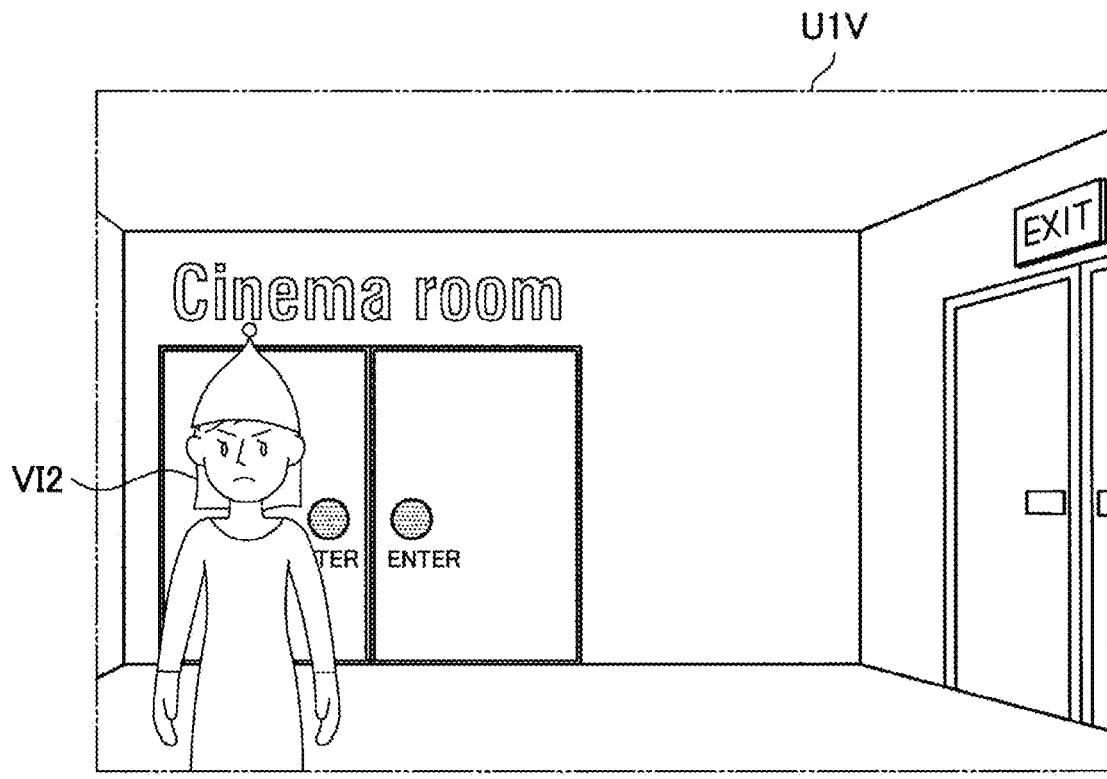
FIG. 4 is an explanatory diagram for explaining an operation of the information processing device according to the embodiment.

The output control unit 132 can display a virtual image corresponding to a latest real image of the other user by acquiring the user information of the other user acquired by the information acquiring unit 110 at all times to reflect it to the virtual image. Because the virtual image of the other user is updated in real time, for example, as illustrated in FIG. 4, a facial expression of the user U2 changes to an angry face, synchronized with a change of facial expression of the user U2 from a smiling face to the angry face, and the user U1 can recognize the state.

The virtual image displayed in virtual space may be an image of the other user imaged by an imaging device that is additionally provided in the information processing device 10, and has a function of imaging an external environment in real space, or may be an image obtained by subjecting a shot image of the other user to predetermined transformation processing. Furthermore, as the image of the other user, an image acquired by an imaging device that is additionally provided in the information processing device 10, and that images at least a part of the face of the user of the information processing device 10 may be used. Specifically, image information of a part of the face of a user shot by the imaging device may be applied as parameters for rendering into a three-dimensional model prepared in advance, to create a virtual image.

The output control unit 132 may further control contents to be output to virtual space according to at least either one of the position information and the attribute information of a user acquired by the user-information acquiring unit 112. The output control unit 132 may be configured to display a virtual image of the other user in the virtual space when a separation distance between users making communication in real space becomes equal to or larger than a predetermined threshold. Moreover, the output control unit 132 may be configured to output such that a virtual image is displayed according to the attribute information, such as a facial expression and a type of voice, of the user acquired right before multiple users that have been making communication at the same place in the real space start moving to respective different places.

Furthermore, the output control unit 132 may be configured to control a virtual image of the other user by using image information of the other user shot by the imaging device while communication in real space is being performed. Specifically, the output control unit 132 may change a virtual image of the other user to respond to an imaged appearance of the other user. The output control unit 132 may perform processing of gradually reducing a difference between a real image and a virtual image, such as morphing, when the displayed virtual image of the other user differs from the real image of the other user and when the user information of the other user is acquired by the user-information acquiring unit 112 while communication is being performed in virtual space.

Moreover, the output control unit 132 may control a virtual image of the other user by using image information of a photograph, video data, and the like of the other user that have been uploaded on an existing network, such as the Internet. Specifically, the output control unit 132 may create a virtual image by applying image information of a photograph, and the like of the other user that have been uploaded on a network as parameters for rendering into a three-dimensional model prepared in advance.

The output control unit 132 may further be configured to output a virtual image of the other user interactively connected by a predetermined display method. For example, when a real image RI2 or the user U2 has a hat on as illustrated in FIG. 5, the output control unit 132 may change to a virtual image VI2 wearing a hat similarly to the real image RI2, causing the virtual image VI2 to make an action of putting the hat on. Furthermore, for example, the output control unit 132 may output a virtual image such that the virtual image moves to a position of a real image. An expression method of move of the virtual image may be, for example, an expression method of expressing a walk. However, the expression method of move of the virtual image to the position of the real image is not particularly limited as long as it coincides with the real image and, for example, as illustrated in a lower part of FIG. 6, an expression of a path as if the virtual image has moved toward the real image may be used.

It is noted herein that there can be a difference between movement of the real image in an actual situation and movement of the virtual image output to virtual space, and if the virtual image is output by the expression method of walking toward the real image, awkwardness can be caused for the user. However, by controlling the virtual image as described above by the output control unit 132, the chances that that user is annoyed by a difference in movement that can be caused between movement of the real image and movement of the virtual image is reduced. Therefore, the output control unit 132 may further be configured to receive the user recognition information acquired by the recognition determining unit 140 described later that has a function of determining whether a user has recognized a real image of the other user in real space, and to display a virtual image by an expression method based on the received user recognition information. For example, as illustrated in FIG. 6, after the recognition determining unit 140 determines that the user U1 has recognized the real image RI2 of the user U2, the output control unit 132 may control to display a path as if the virtual image VI2 has moved toward the real image RI2. The output control unit 132 may be configured to be capable of outputting a virtual image by various expression methods, not limited to the expression method described above, as long as it is an expression method by which movement of the virtual image is expressed.

The output control unit 132 may further be configured to control the virtual image to disappear after displaying that the virtual image of the other user for with which interactive communication is connected has moved to the position of the real image. The switching control unit 120 may terminate connection between the users established in virtual space after the virtual image of the other user is controlled to disappear. The expression method for movement of the virtual image to the position of the real image may be, as described previously, an expression of a path as if the virtual image VI2 has moved toward the real image RI2, for example, as illustrated in the lower part of FIG. 6. By controlling to disappear the virtual image after the virtual image of the other user has moved to the position of the real image by the output control unit 132, the user can grasp the position of the real image of the other user easily.

Figure 7:
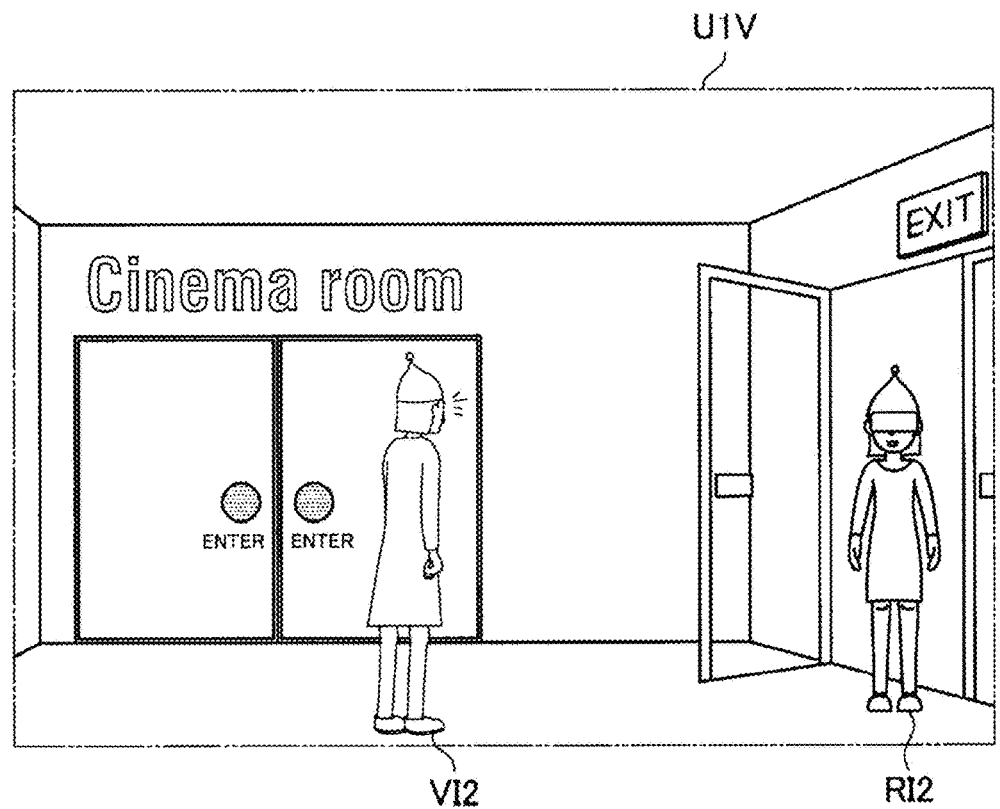
FIG. 7 is an explanatory diagram for explaining an operation of the information processing device according to the embodiment.

The output control unit 132 may be configured to output the virtual image of the other user with which interactive communication is connected indicates a real image direction of the other user. The output control unit 132 may display, for example, such that the virtual image VI2 of the user U2 faces toward the position of the real image RI2 based on the user information acquired by the user-information acquiring unit 112 as illustrated in FIG. 7 when a separation distance between the users in real space becomes equal to or smaller than the predetermined threshold while communication is being performed in the virtual space. By displaying the virtual image of the other user to face toward to the real image direction, the user can grasp the position of the other user in real space (that is, the real image) easily.

The output control unit 132 may further be configured to output a virtual image that has been set in advance by the other user interactively connected. Specifically, the user-information acquiring unit 112 transmits only predetermined user information set by the other user to the output control unit 132, and does not need to transmit user information acquired by the other method to the output control unit 132. At this time, the user information may be information set by the other user also, and as a result of reflecting the user information, the output control unit 132 may control to display the virtual image different from the appearance of the real image.

Figure 8:
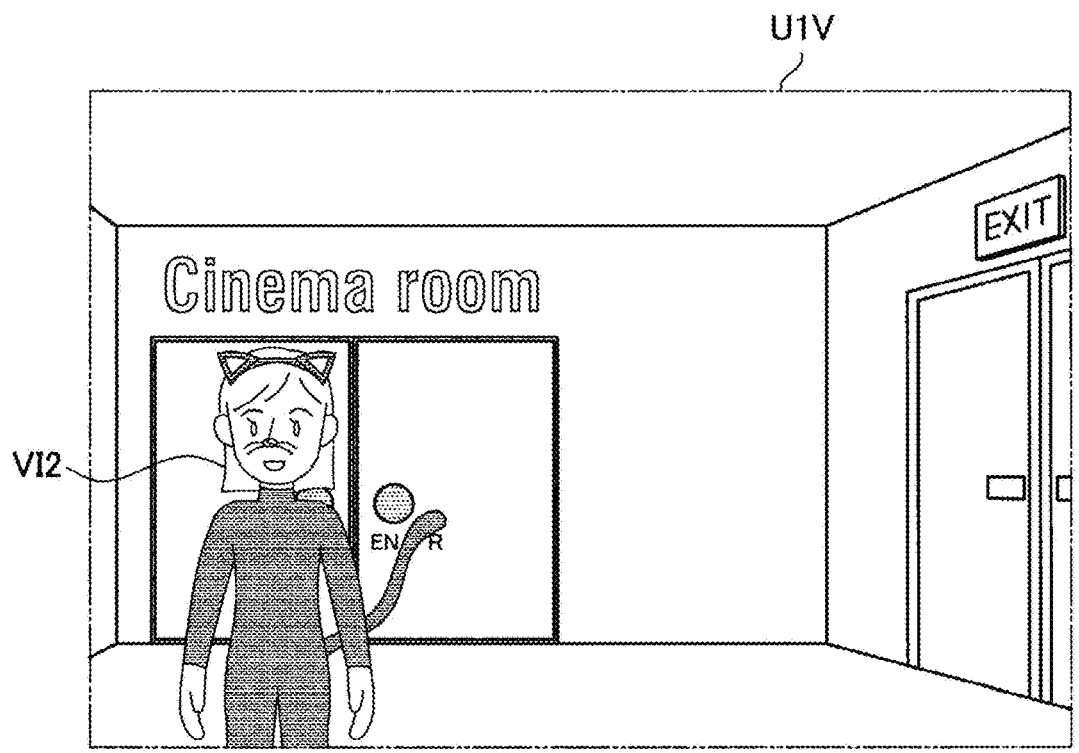
FIG. 8 is an explanatory diagram for explaining an operation of the information processing device according to the embodiment.

The output control unit 132 may further be configured to control to display a virtual image that is a virtual image of the other user interactively connected and that is output in a different appearance from an appearance in real space, by superimposing on the real image of the other user. More specifically, the output control unit 132 may output the virtual image VI2 of the user U2 to be displayed in an appearance set by the user U1 such that the appearance differs from the real image RI2 of the user U2, for example, as illustrated in FIG. 8. By controlling to display the virtual image of the other user in a different appearance from the real image by superimposing it on the real image of the other user by the output control unit 132, the other user in such an appearance that may look out of place if it is present in real space can be displayed only in virtual space. As a result, the user can have limited communication in which other people present therearound are not involved, without drawing unnecessary attention of people present around the other user in real space to the other user. As a result, users having communication by using the information processing device 10 according to the present embodiment can obtain, for example, a feeling as if they are having a costume party or the like, only among the users.

Figure 9:
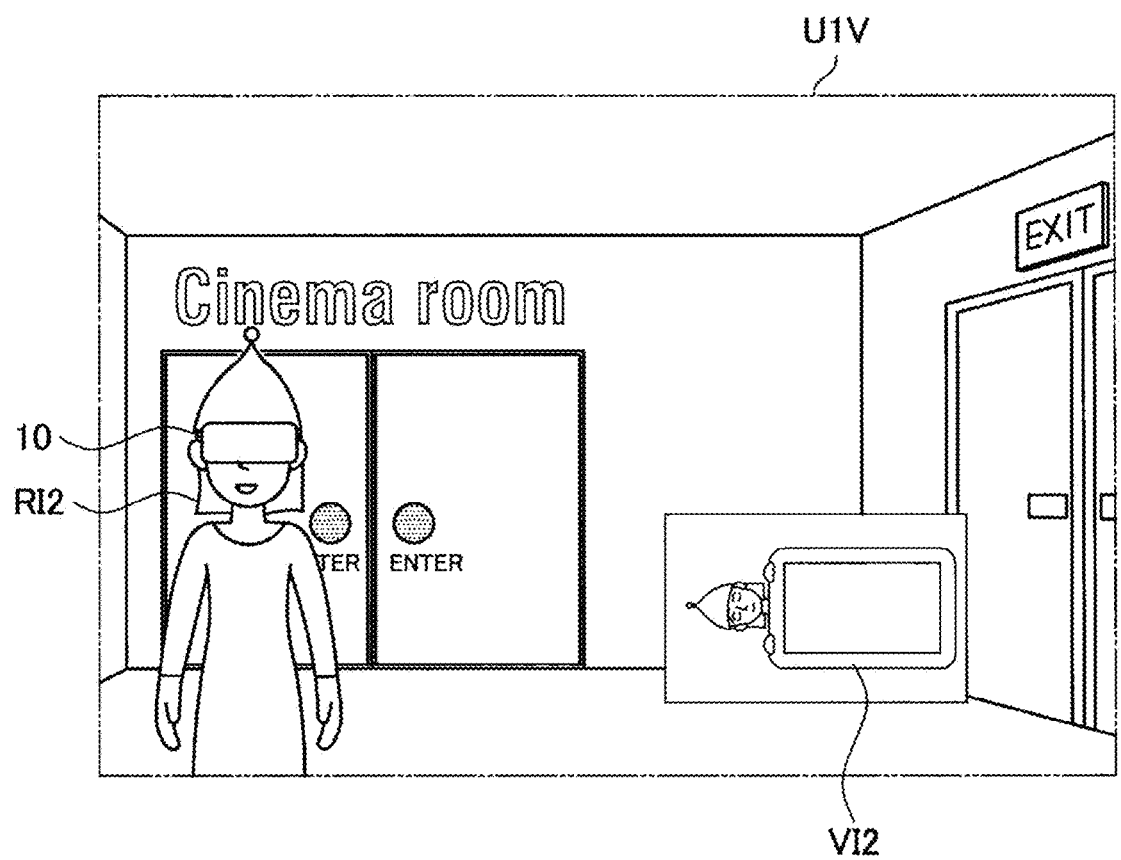
FIG. 9 is an explanatory diagram for explaining an operation of the information processing device according to the embodiment.

The output control unit 132 may further be configured to display the virtual image of the other user in an appearance different from the appearance of the real image while having communication in real space with the other user with which interactive communication has been connected. The output control unit 132 may display, for example, as illustrated in FIG. 9, the virtual image VI2 in an appearance indicating that the function is suspended while keeping the display of the virtual image VI2 when communication is being made between the users in real space also. Thereafter, when the communication between the users is switched from the real space to virtual space, the output control unit 132 may control to display the virtual image that has been displayed in the appearance different from the real image to coincide with the real image. The communication between the users may be thereby continued.

The information processing device 10 according to the present embodiment may include a voice output unit that has a function of outputting voice, and voice information output to a user may be output from the voice output unit. The output control unit 132 may further be configured to control to output voice information that is acquired by the voice-information acquiring unit 116 artificially from a predetermined position. That is, it may be configured such that a position of a sound image is gradually brought closer to a position of the real image, and when the position of the sound image coincides with the position of the real image, output of the voice information is stopped so that the user can recognize the other user in real space, that is, a voice of the real image. Moreover, when communication space is switched from real space to virtual space, the output control unit 132 may output the voice information, matching the position of the real image with the position of the sound image. Furthermore, the output control unit 132 may change a volume according to a separation distance between the users. More specifically, the output control unit 132 may control the position of the sound image, for example, by using a publicly-known voice output technique, or the like. Thus, the user can obtain a feeling as if to actually meet and have conversation with the other user in the virtual space.

In an actual situation, a time gap between the output timing of the output voice information and the generation timing of a voice output from the real image can be generated. Therefore, the output control unit 132 may control to cancel the voice output from the real image and to output the relevant voice information from the virtual image, for example, by using a sound separation technique, which is one of publicly-known techniques. Moreover, it may be configured such that not only the voice output by the real image, but also entire sound in the real space is cutoff, and voice information is reconstructed as necessary to output from the virtual space. Furthermore, the output control unit 132 may control an output-device image-output condition and a sound output condition for outputting the virtual space.

The output control unit 132 may control to display not only a virtual image of the other user with which communication is performed, but also, for example, any kind of object specified by the user, such as a pet owned by the user as a virtual image in the virtual space. The virtual image created by specification by the user may be provided to multiple users performing communication, or may be provided only to the user that specified the object.

Furthermore, the output control unit 132 may control an output-device image-output condition and a sound output condition for outputting the virtual space.

Recognition Determining Unit 140

The information processing device 10 according to the present embodiment may include the recognition determining unit 140, and the recognition determining unit 140 may have a function of determining whether a user has recognized a real image of the other user interactively connected therewith in real space. Recognition determination of the real image of the other user by the recognition determining unit 140 may be performed by using a publicly-known view-point recognition technique. The recognition determining unit 140 may be configured to detect a position of a viewpoint of the user, for example, by using the viewpoint recognition technique, and to determine whether the user has recognized the real image of the other user based on viewpoint position information regarding the position of the viewpoint and the position information of the other user acquired by the user-information acquiring unit 112.

Moreover, the recognition determining unit 140 may determine whether the user has recognized the real image of the other user by using a publicly-known voice recognition technique. For example, the recognition determining unit 140 may determine that the real image of the other user has recognized when voice information for user determination, such as a word used when the user calls out to the other user, is detected by using the voice recognition technique. At this time, by using the position information acquired by the user-information acquiring unit 112 in addition to the voice information, the recognition determining unit 140 can perform the recognition determination of the real image of the other user with high accuracy compared to a case without using the position information.

Communication Controlling Unit 150

The communication controlling unit 150 controls communication between users through the network 20, and performs processing of connecting communication with the predetermined other user, or of terminating the connection in response to a control instruction by the communication control unit 130. Moreover, the communication controlling unit 150 performs processing of providing the position information, the attribute information, the action information, the voice information, and the like acquired by the information-acquiring unit 110 to the other user with which the communication is connected.

Storage Unit 160

The storage unit 160 is an example of a storage device included in the information processing device 10 according to the present embodiment. The storage unit 160 appropriately stores various kinds of programs, databases, and the like to be used when the respective kinds of processing as described above are performed. The storage unit 160 may store various kinds of information acquired by the information acquiring unit as described above as history information. Furthermore, the storage unit 160 may store, for example, progress of various processing and the like that become necessary to be saved when the information acquiring unit 110, the recognition determining unit 140, and the like perform the respective processing as appropriate. Not limited to the processing performed by the information acquiring unit 110 and the recognition determining unit 140, various parameters, progress of processing, and the like that become necessary to be saved when the information processing device 10 according to the present embodiment perform any kind of processing may be stored as appropriate. The information acquiring unit 110, the switching control unit 120, the communication control unit 130, the recognition determining unit 140, and the like can perform read/write processing with respect to this storage unit 160 freely.

One example of the configuration of the information processing device 10 has been described in detail hereinabove. The respective components described above may be configured by using general parts and circuits, or may be configured by hardware specified in the functions of the respective components. Moreover, the entire functions of the respective components may be performed by a CPU or the like. Therefore, the configuration to be used may be appropriately changed according to a technical level of each implementation of the present embodiment. Subsequently, one example of operation of the information processing device 10 will be described in detail.

Operation

Operation Example 1

Figure 10:
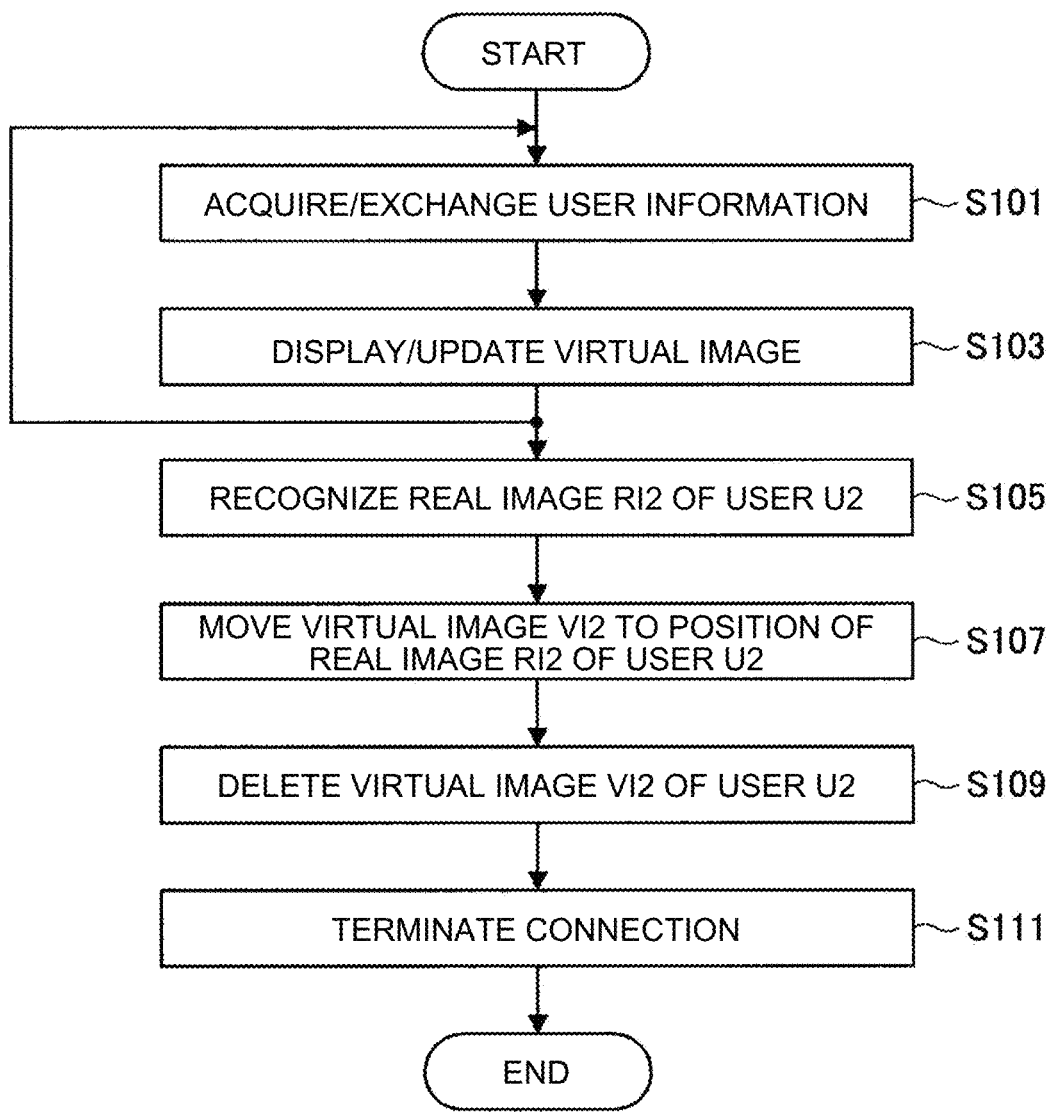
FIG. 10 is a flowchart for explaining an example of a flow of an operation of the information processing device according to the embodiment.

An operation of the information processing device 10 according to the present embodiment will be described, referring to FIG. 10. FIG. 10 is a flowchart illustrating an example of a flow of an operation of the information processing device according to the embodiment. First, an operation of switching communication performed in virtual space to communication performed in real space will be described. In this operation example, a case in which the user U1 and the user U2 are present in distant places, and the user U1 and the user U2 meet each other at a meeting place in real space while using the information processing device 10 according to the present embodiment will be explained as an example.

First, the operation according to the present embodiment is started in a state in which communication between the use U1 and the user U2 is connected, and the user information of the user U1 and the user U2 are acquired to be exchanged (S101). More specifically, the user-information acquiring units 112 of the information processing devices 10 used by the user U1 and the user U2 acquire the user information, such as the respective position information and attribute information, of the user U1 and the user U2. The respective acquired user information is transmitted and received through the communication controlling units 150 to and from each other. Subsequently, virtual images of the user U1 and the user U2 are displayed based on the acquired user information (S103). More specifically, as illustrated in FIG. 2, the virtual space U1V is created in the information processing device 10 of the user U1, and the virtual image VI2 of the user U2 is created in the virtual space U1V. Similarly, the virtual space U2V is created in the information processing device 10 of the user U2, and the virtual image VI1 of the user U1 is created in the virtual space U2V. The created virtual space is an image in which the other user is displayed in real space, but for example, any kind of object specified by the user, such as a pet owned by the user, may be displayed as a virtual image in the virtual space. The user U1 can have conversation with the virtual image VI2 in the virtual space U1V, and the user U2 can have conversation with the virtual image VI1 in the virtual space virtual image VI2.

S101 and S103 are repeated at all times, and latest user information of the user U1 and the user U2 is acquired by the user-information acquiring units 112, and the virtual image U1V and the virtual image U2V are updated to the virtual image U1V and the virtual image U2V according to the latest user information at all times. Subsequently, the recognition determining unit 140 determines whether the user has recognized the other user (S105). More specifically, when a separation distance between the user U1 and the user U2 becomes equal to or smaller than a predetermined threshold, and when the user U1 and the user U2 are present in the same environment, for example, as illustrated in an upper part of FIG. 5, the virtual image VI2 of the user U2 may face to a direction of the real image RI2 of the user U2.

Furthermore, when the user U1 finds the user U2 in the real space (that is, the real image RI2 of the user U2), the recognition determining unit 140 may determine that the real image RI2 of the user U2 has been recognized based on recognition information acquired with finding by the user U1. At this time, when appearances of the real image RI2 and the virtual image VI2 of the user U2 differ from each other although the user information has been updated to the latest one at S101 and S103, the output control unit 132 may change the appearance of the virtual image VI2 to correspond to the real image RI2. For example, as illustrated in a lower part of FIG. 5, when the real image RI2 has a hat on, the output control unit 132 may control the virtual image VI2 on such that the virtual image VI2 makes an action of putting a hat on to wear the hat Although the user information has been updated to the latest one by the user-information acquiring units 112 at S101 and S103, if only the user information that has been set by the user U2 in advance is reflected to the virtual image VI2, the virtual image VI2 that differs from appearance of the real image RI2 is displayed. As a result, the user U1 can see the actual figure of the user U2 for the first time only when seeing the real image RI2 of the user U2.

Subsequently, the output control unit 132 may move the virtual image VI2 of the user U2 to the position of the real image RI2 of the user U2 (S107). The output control unit 132 may move the virtual image VI2 so as to walk toward the position of the real image RI2. When appearances of the real image RI2 and the virtual image VI2 significantly differ from each other, there is a possibility that the user U1 have awkwardness. Accordingly, the output control unit 132 may output any kind of animation to output contents showing that the virtual image VI2 has moved toward the real image RI2. The output control unit 132 may output, for example, an expression, such as a path expressing movement toward the position of the real image RI2, or the like as illustrated in the lower part of FIG. 6. Furthermore, after the virtual image VI2 of the user U2 has moved to the position of the real image RI2 of the user U2, the output control unit 132 makes the virtual image VI2 disappear (S109), and the communication controlling unit 150 may terminate the established communication (S111). As the information processing device 10 according to the present embodiment operates as described above, space in which the user U1 and the user U2 perform communication can be switched from virtual space to real space in a non-interrupted and natural manner.

At S109, the output control unit 132 may control a display, for example, such that the virtual image VI2 having an appearance different from the real image RI2 of the user U2 is superimposed on the real image RI2 as illustrated in FIG. 8. Moreover, the output control unit 132 does not need to make the virtual image VI2 disappear, but may keep displaying the virtual image VI2 in an appearance indicating that the function is suspended, for example, as illustrated in FIG. 9.

Operation Example 2

Figure 11:
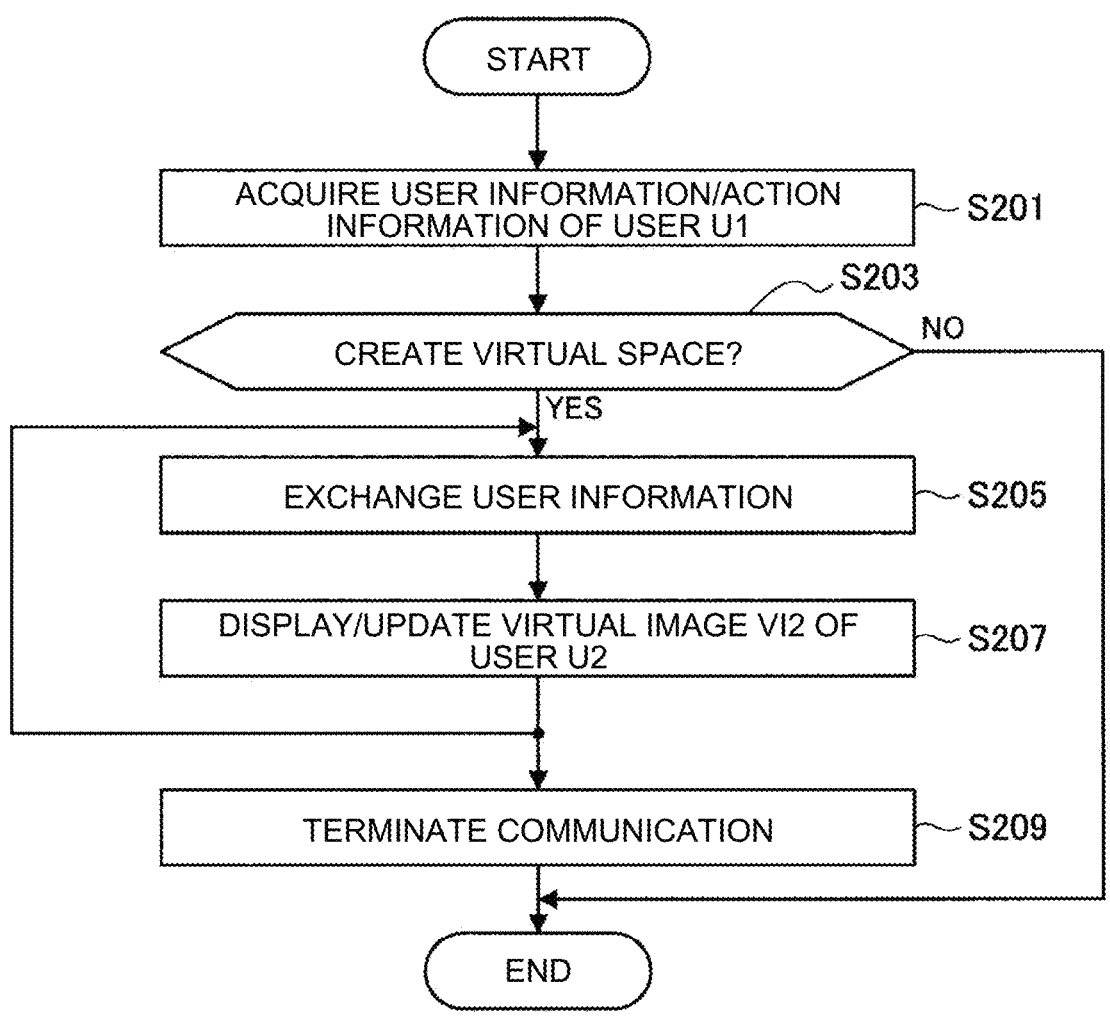
FIG. 11 is a flowchart for explaining an example of a flow of an operation of the information processing device according to the embodiment.

Subsequently, another operation of the information processing device 10 according to the present embodiment will be described, referring to FIG. 11. FIG. 11 is a flowchart illustrating an example of a flow of an operation of the information processing device 10 according to the embodiment. An operation in which communication being performed in real space is switched to communication performed in virtual space will be described. In this operation example, a case in which the user U1 and the user U2 present in the same place in real space move to respective different places will be explained as an example.

First, the operation according to the present embodiment is started in a state in which communication between the user U1 and the user U2 is connected. The information-acquiring unit 110 provided in the information processing device 10 used by the user U1 acquires the user information of the user U1 (S201). At this time, the information acquiring unit 110 may acquire not only the user information of the user U1, but also the action information and the voice information of the user U1. Subsequently, the communication control unit 130 provided in the information processing device 10 used by the user U1 creates the virtual space U1V to be provided to the user U1 in accordance with an instruction of the user U1 (S203). The communication control unit 130 may create the virtual space U1V automatically according to the user information of the user U1 acquired by the information acquiring unit 110 and the like, not only in accordance with the instruction of the user U1. For example, it may be configured such that when a separation distance between the user U1 and the user U2 becomes equal to or larger than a predetermined threshold, the virtual space U1V is created automatically. Moreover, the virtual space U1V may be created automatically according to the attribute information, such as a facial expression and a type or voice of the user U2 right before the user U1 and the user U2 start moving to the respective different places. When the user U1 wishes to have communication with multiple users, those users may be selected by a predetermined operation by the user U1, and virtual images of the other users may be created in the virtual space U1V. Subsequently, the user information of the user U1 and the user U2 are exchanged (S205), and the virtual image VI2 of the user U2 is created (S207). Because S205 and S207 are the same as S101 and S103 explained previously in the operation example 1, detailed explanation thereof is omitted.

Finally, the communication control unit 130 performs termination processing of communication (S209). As for the termination processing of communication, for example, when the voice-information acquiring unit 116 acquires predetermined voice information, such as a farewell greeting, the voice-information acquiring unit 116 performs voice recognition to generate voice recognition information. The communication control unit 130 may terminate the communication based on the voice recognition information. Furthermore, for example, when the information processing device 10 is implemented by a wearable device, such as augmented reality (AR) glasses, the communication may be terminated by removing the wearable device worn by the user from the user's body.

The operation examples of the information processing device 10 according to the present embodiment have been described in detail hereinabove. Subsequently, another operation example will be described in detail.

Hardware Configuration

Hereinabove, the embodiment according to the present disclosure has been described. The information processing described above is implemented by cooperation of software and hardware of the information processing device described below.

Figure 12:
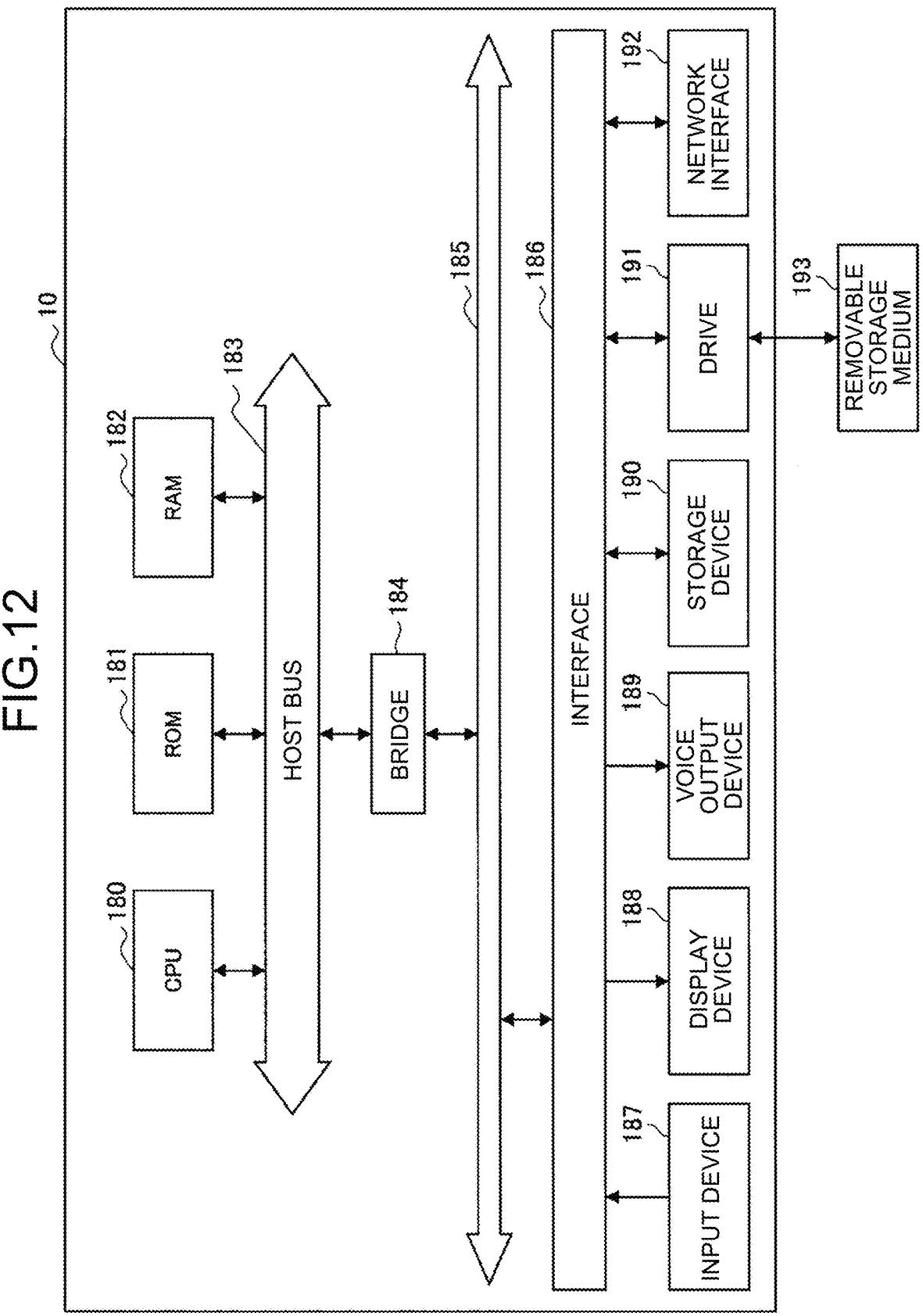
FIG. 12 is a block diagram illustrating a hardware configuration example of the information processing device according to the embodiment.

FIG. 12 is a block diagram illustrating a hardware configuration of the information processing device according to the embodiment. The information processing device includes a central processing unit (CPU) 180, a read only memory (ROM) 181, a random access memory (RAM) 182, a host bus 183, a bridge 184, an external bus 185, an interface 186, a display device 188, a voice output device 189, a storage device (HDD) 190, and a network interface 913. The information. processing device according to the present embodiment may include an input device 187 and a drive 191.

The CPU 180 functions as an arithmetic processing device and a control device, and controls overall operation in the information processing device according to various kinds of programs. Moreover, the CPU 180 may be a micro-processor. The ROM 181 stores a program, arithmetic parameters, and the like used by the CPU 180. The RAM 182 temporarily stores a program that is used in execution by the CPU 180, parameters that appropriately vary in the execution, and the like. These are connected with one another through the host bus 183 constituted of a CPU bus and the like. By cooperation of the CPU 180, the ROM 181, and the RAM 182, and software, the functions of the information acquiring unit 110, the switching control unit 120, the communication control unit 130, the recognition determining unit 140, and the like are implemented.

The host bus 183 is connected to the external bus 185, such as a peripheral component interconnect/interface (PCI) bus through the bridge 184. Note that the host bus 183, the bridge 184, and the external bus 185 are not necessarily configured separately, but the functions of these components may be implemented by a single bus.

The input device 187 can be constituted of input means for a member to input information, such as a touch panel, a button, a microphone, a sensor, a switch, and a lever, an input control circuit that generates an input signal based on an input by the member and outputs it to the CPU 180, and the like.

The display device 188 includes, for example, a display device, such as a cathode ray tube (CRT) display device, a liquid crystal display (LCD) device, and an organic light emitting diode (OLED) device, and the like.

The storage device 190 is a device for data storage, constituted of one example of a storage unit of the information processing device according to the present embodiment. The storage device 190 may include a storage medium, a recording device that records data on the storage medium, a reader device that reads data from the storage medium, a deletion device that deletes data recorded on the storage medium, and the like. The storage device 190 is constituted of, for example and a hard disk drive (HDD), a solid storage drive (SSD), or a memory that has an equivalent function, and the like. This storage device 190 drives a storage, and stores a program executed by the CPU 180 and various kinds of data.

The drive 191 is a reader/writer for a storage medium, and is equipped in the information processing device, or provided externally. The drive 191 reads information recorded on a removable storage medium 193 inserted therein, such as a magnetic dis, an optical disk, a magneto-optical disk, and a semiconductor memory, and outputs it to the RAM 182 or the storage device 190. Moreover, the drive 191 can write information on the removable storage medium 193 also.

The network interface 192 is a communication interface that is constituted of, for example, a communication device to connect to the network 20, and the lke. Furthermore, the network interface 192 may be a terminal supporting a wireless local area network (LAN) or a wired communication terminal that performs wired communication.

Conclusion

Hereinabove, exemplary embodiments of the present disclosure have been described in detail with reference to the accompanying drawings, but the technical scope of the present disclosure is not limited to those examples. It is obvious that various alteration examples and correction examples can be thought by those having general knowledge in the technical field of the present disclosure within the category of technical thought described in claims, and these are naturally understood as to belong to the technical range of the present disclosure also.

Moreover, the effects described in the present application are only for explanation and exemplification, and are not limited. That is, the technique according to the present disclosure can produce other effects obvious to those skilled in the art from the description of the present application, together with the above effects, or in place of the above effects.

Note that configurations as described below also belong to the technical range of the present disclosure.

(1)

An information processing device comprising:

a communication control unit that controls communication performed in virtual space in which a virtual image corresponding to a real image of a user present in real space is created, interactively between users through the virtual image of the user;

a user-information acquiring unit that acquires position information regarding a position of the user in the real space and attribute information including at least information regarding intimacy between the users, at predetermined timing; and a switching control unit that controls switching between communication performed in the real space and communication performed in the virtual space according to at least either one of the position information and the attribute information.

(2)

The information processing device according to (1), further comprising an action-information acquiring unit that acquires action information regarding an action of the user, wherein the switching control unit establishes network connection between the users according to at least either one of the action information of the user and the action information of the other user interactively connected thereto, and switches space in which communication is performed from the real space to the virtual space.

(3)

The information processing device according to (1) or (2), further comprising a voice-information acquiring unit that acquires voice information regarding a voice spoken by the user, wherein the switching control unit establishes network connection between the users according to at least either one of the voice information of the user and the voice information of the other user interactively connected thereto, and switches space in which communication is performed from the real space to the virtual space.

(4)

The information processing device according to any one of (1) to (3), further comprising an action-information acquiring unit that acquires action information regarding an action of the user, wherein the switching control unit selects at least one of other users from among a plurality of the users according to the action information acquired by the action-information acquiring unit, and switches from communication performed in the real space to communication performed in the virtual space.

(5)

The information processing device according to any one of (1) to (4), further comprising an output control unit that controls contents to be output to the virtual space according to at least either one of the position information and the attribute information.

(6)

The information processing device according to any one of (1) to (5), wherein the output control unit outputs the virtual image of the other user to which the user is interactively connected in a predetermined display method.

(7)

The information processing device according to any one of (1) to (6), further comprising a recognition determining unit that recognizes another user interactively connected, and that acquires user-recognition information regarding user recognition, wherein the output control unit receives the user recognition information transmitted from the recognition determining unit, and then outputs the virtual image of the other user in a predetermined expression method to synchronize the real image of the other user and the virtual image of the other user.

(8)

The information processing device according to any one of (1) to (7), wherein the output control unit outputs the virtual image of the other user interactively connected so as to indicate a real image direction of the other user.

(9)

The information processing device according to any one of (1) to (8), wherein the output control unit causes the virtual image of the other user interactively connected to disappear at a position of the real image, and the switching control unit terminates connection between the users established in the virtual space.

(10)

The information processing device according to any one of (1) to (9), wherein the output control unit outputs a virtual image that is set in advance by the other user interactively connected.

(11)

The information processing device according to any one of (1) to (10), wherein the output control unit displays the virtual image that is the virtual image of the other user interactively connected, and that is output in a different appearance from an appearance in the real space in a superimposed manner on the real image of the other user.

(12)

The information processing device according to any one of (1) to (11), wherein the output control unit displays the virtual image of the other user in a different appearance from an appearance in the real space during the user is performing communication in the real space with the other user interactively connected.

(13)

The information processing device according to any one of (1) to (12), further comprising a voice-information acquiring unit that acquires voice information regarding a voice spoken by the user, wherein the communication control unit further includes an output control unit that controls contents to be output to the virtual space according to the position information and the attribute information, and the output control unit controls output position of the voice information acquired by the voice-information acquiring unit.

(14)

An information processing method comprising:

controlling communication performed in virtual space in which a virtual image corresponding to a real image of user present in real space is created, interactively between users through the virtual image of the user;

acquiring position information regarding a position of the user in the real space and attribute information including at least information regarding intimacy between the users, at predetermined timing; and controlling switching between communication performed in the real space and communication performed in the virtual space according to at least either one of the position information and the attribute information.

(15)

A computer program that causes a computer to perform functions of:

a communication control unit that controls communication performed in virtual space in which a virtual image corresponding to a real image of a user present in real space is created, interactively between users through the virtual image of the user;

a user-information acquiring unit that acquires position information regarding a position of the user in the real space and attribute information including at least information regarding intimacy between the users, at predetermined timing; and a switching control unit that controls switching between communication performed in the real space and communication performed in the virtual space according to at least either one of the position information and the attribute information.

REFERENCE SIGNS LIST

5 INFORMATION PROCESSING SYSTEM
10 INFORMATION PROCESSING DEVICE
20 NETWORK
110 INFORMATION ACQUIRING UNIT
112 USER-INFORMATION ACQUIRING UNIT
114 ACTION-INFORMATION ACQUIRING UNIT
116 VOICE-INFORMATION ACQUIRING UNIT
120 SWITCHING CONTROL UNIT
130 COMMUNICATION CONTROL UNIT
140 RECOGNITION DETERMINING UNIT
150 COMMUNICATION CONTROLLING UNIT
160 STORAGE UNIT
550 DISPLAY CONTROL DEVICE

The invention claimed is:

1. An information processing device comprising:
a communication control unit configured to control communication performed in virtual space in which a virtual image corresponding to a real image of a user present in real space is created, interactively between the user and at least one other user through the virtual image of the user;
a user-information acquiring unit configured to acquire position information regarding a position of the user in the real space and attribute information including at least information regarding intimacy between the user and the at least one other user, at predetermined timing;
a switching control unit configured to control switching between communication performed in the real space and communication performed in the virtual space according to at least one of the position information or the attribute information; and an output control unit configured to control contents to be output to the virtual space according to at least one of the position information or the attribute information, wherein the switching control unit is further configured to control the switching between the communication performed in the real space and communication performed in the virtual space according to position information regarding a position of the at least one other user, wherein the output control unit is further configured to control display of a virtual image of the at least one other user interactively connected, wherein the virtual image of the at least one other user is displayed in relation to the real space, wherein the virtual image of the at least one other user is output in a different appearance from an appearance in the real space in a superimposed manner on a real image of the at least one other user, and wherein the communication control unit, the user-information acquiring unit, the switching control unit, and the output control unit are each implemented via at least one processor.

2. The information processing device according to claim 1, further comprising:

an action-information acquiring unit configured to acquire action information regarding an action of the user, wherein the switching control unit is further configured to establish network connection between the user and the at least one other user according to at least one of the action information of the user or action information of the at least one other user interactively connected thereto, and switch space in which communication is performed from the real space to the virtual space, and wherein the action-information acquiring unit is implemented via at least one processor.

3. The information processing device according to claim 1, further comprising:

a voice-information acquiring unit configured to acquire voice information regarding a voice spoken by the user, wherein the switching control unit is further configured to establish network connection between the user and the at least one other user according to at least one of the voice information of the user or voice information of the at least one other user interactively connected thereto, and switch space in which communication is performed from the real space to the virtual space, and wherein the voice-information acquiring unit is implemented via at least one processor.

4. The information processing device according to claim 1, further comprising:

an action-information acquiring unit configured to acquire action information regarding an action of the user, wherein the switching control unit is further configured to select the at least one other user from among a plurality of users according to the action information acquired by the action-information acquiring unit, and switch from communication performed in the real space to communication performed in the virtual space, and wherein the action-information acquiring unit is implemented via at least one processor.

5. The information processing device according to claim 1, wherein the output control unit is further configured to control output of the virtual image of the at least one other user to which the user is interactively connected in a predetermined display method.

6. The information processing device according to claim 1, further comprising:

a recognition determining unit configured to
recognize the at least one other user interactively connected, and
acquire user-recognition information regarding user recognition, wherein the output control unit is further configured to
receive the user recognition information transmitted from the recognition determining unit, and
output the virtual image of the at least one other user in a predetermined expression method to synchronize a real image of the at least one other user and the virtual image of the at least one other user, and
wherein the recognition determining unit is implemented via at least one processor.

7. The information processing device according to claim 1, wherein the output control unit is further configured to output the virtual image of the at least one other user interactively connected so as to indicate a real image direction of the at least one other user.

8. The information processing device according to claim 1, wherein the output control unit is further configured to cause the virtual image of the at least one other user interactively connected to disappear at a position of the real image of the at least one other user, and
the switching control unit is further configured to terminate a connection between the user and the at least one other user established in the virtual space.

9. The information processing device according to claim 1, wherein the output control unit is further configured to control output of the virtual image of the at least one other user that is set in advance by the at least one other user interactively connected.

10. The information processing device according to claim 1, wherein the output control unit is further configured to display the virtual image of the at least one other user in a different appearance from an appearance in the real space while the user is performing communication in the real space with the at least one other user interactively connected.

11. The information processing device according to claim 1, further comprising:

a voice-information acquiring unit configured to acquire voice information regarding a voice spoken by the user, wherein the output control unit is further configured to control an output position of the voice information acquired by the voice-information acquiring unit, and wherein the voice-information acquiring unit is implemented via at least one processor.

12. The information processing device according to claim 1, wherein the virtual image of the at least one other user is updated in real time.

13. An information processing method comprising:

controlling communication performed in virtual space in which a virtual image corresponding to a real image of a user present in real space is created, interactively between the user and at least one other user through the virtual image of the user;

acquiring position information regarding a position of the user in the real space and attribute information including at least information regarding intimacy between the user and the at least one other user, at predetermined timing;

controlling switching between communication performed in the real space and communication performed in the virtual space according to at least one of the position information or the attribute information; and controlling contents to be output to the virtual space according to at least one of the position information or the attribute information, wherein the switching between the communication performed in the real space and communication performed in the virtual space is controlled further according to position information regarding a position of the at least one other user, wherein the contents are controlled to be output in order to display a virtual image of the at least one other user interactively connected, wherein the virtual image of the at least one other user is displayed in relation to the real space, and wherein the virtual image of the at least one other user is output in a different appearance from an appearance in the real space in a superimposed manner on a real image of the at least one other user.

14. A non-transitory computer-readable storage medium having embodied thereon a program, which when executed by a computer causes the computer to execute a method, the method comprising:

controlling communication performed in virtual space in which a virtual image corresponding to a real image of a user present in real space is created, interactively between the user and at least one other user through the virtual image of the user;

acquiring position information regarding a position of the user in the real space and attribute information including at least information regarding intimacy between the user and the at least one other user, at predetermined timing;

controlling switching between communication performed in the real space and communication performed in the virtual space according to at least one of the position information or the attribute information; and controlling contents to be output to the virtual space according to at least one of the position information or the attribute information, wherein the switching between the communication performed in the real space and communication performed in the virtual space is controlled further according to position information regarding a position of the at least one other user, wherein the contents are controlled to be output in order to display a virtual image of the at least one other user interactively connected, wherein the virtual image of the at least one other user is displayed in relation to the real space, and wherein the virtual image of the at least one other user is output in a different appearance from an appearance in the real space in a superimposed manner on a real image of the at least one other user.

* * * * *